United States Patent [19]

Steidle et al.

[11] 4,138,984
[45] Feb. 13, 1979

[54] LIGHT ALLOY PISTON FOR DIESEL ENGINES

[75] Inventors: Werner Steidle, Bad Friedrichshall II; Wilfried Sander; Ernst Deubelbeiss, both of Neckarsulm, all of Fed. Rep. of Germany

[73] Assignee: Karl Schmidt GmbH, Neckarsulm, Fed. Rep. of Germany

[21] Appl. No.: 658,006

[22] Filed: Feb. 13, 1976

[30] Foreign Application Priority Data

Feb. 24, 1975 [DE] Fed. Rep. of Germany ....... 2507899

[51] Int. Cl.$^2$ ............................................. F02F 3/12
[52] U.S. Cl. ............................... 123/193 P; 123/30 C; 123/32 AA; 92/213; 92/223
[58] Field of Search ................. 92/213, 223, 224, 222; 123/30 C, 30 D, 32 C, 32 K, 193 P, 193 CH, 32 AA; 204/15, 25, 33, 58; 148/6.27; 428/469

[56] References Cited

U.S. PATENT DOCUMENTS

| 1,426,138 | 8/1922 | Allyne | 92/223 |
| 1,869,041 | 7/1932 | Bengston | 92/223 |
| 2,420,474 | 5/1947 | Graham | 123/193 P |
| 2,692,852 | 10/1954 | Burrows | 204/58 |
| 2,762,724 | 9/1956 | Brennan | 204/58 |
| 3,149,409 | 9/1964 | Maruhn | 123/193 P |
| 3,221,722 | 12/1965 | Bachle | 123/193 P |
| 3,251,349 | 5/1966 | Isley | 123/193 P |
| 3,681,149 | 8/1972 | Ito | 148/6.27 |
| 3,807,014 | 4/1974 | Hummel | 123/193 P |
| 3,986,897 | 10/1976 | McMillan | 148/6.27 |

FOREIGN PATENT DOCUMENTS

| 2027649 | 12/1971 | Fed. Rep. of Germany | 123/193 P |
| 2432990 | 1/1975 | Fed. Rep. of Germany | 123/193 P |
| 491974 | 9/1968 | United Kingdom | 92/223 |

Primary Examiner—Charles J. Myhre
Assistant Examiner—Craig R. Feinberg
Attorney, Agent, or Firm—Sprung, Felfe, Horn, Lynch & Kramer

[57] ABSTRACT

A light alloy piston for diesel engines includes a piston head coated with a hard annodized layer having a combustion chamber recess and/or a fuel-guiding channel provided adjacent to the edge of the combustion chamber recess and/or valve pockets. The piston head is free of a hard anodized layer in those regions which are highly stressed by gas and mass forces. Preferably those regions of the piston head adjacent to edge portions of the combustion chamber recess lying in the direction of the piston pin are free of a hard anodized layer.

6 Claims, 5 Drawing Figures

LIGHT ALLOY PISTON FOR DIESEL ENGINES

BACKGROUND

This invention relates to a light alloy piston for diesel engines, comprising a piston head coated with a hard anodized layer and formed with a combustion chamber recess and/or with a fuel-guiding channel provided adjacent to the edge of the combustion chamber recess and/or with valve pockets.

Light alloy pistons are widely used in diesel engines, because light alloy pistons have a higher thermal conductivity so that in the upper portion of the medium pressure range they have a much lower temperature than a control piston of gray cast iron.

Such progress has been made in the improvement of the properties of the light metals that a comparatively uniform heat distribution is obtained in the light alloy piston so that the internal stresses and with them the danger of a formation of thermal cracks are reduced. Another advantage of the light alloy piston resides in that it has only half the weight of a piston of gray cast iron so that the moving masses of the engine are reduced and the balancing of masses is simplified. As a result, the velocity of the piston may be increased.

In diesel engines under high load, however, light alloy pistons are subjected to relatively high gas pressures and correspondingly increased mechanical stresses and an increased ingress of heat, resulting in higher temperatures and higher stresses due to the temperature gradients.

The temperatures are generally about 300° C. or higher, particularly at the piston head, so that the high-temperature strength of the known materials for light alloy pistons is often insufficient and thermal cracks may be formed at the piston head. Specifically, strong local overheating, e.g., under combustion chambers results in a softening and melting of the piston head. The following measures have been used to prevent or retard thermal cracks and melting.

a. Keeping the temperatures at the piston head within a range which is tolerable by the light alloy material by spray-cooling the piston head or by embedding cooling coils passed through by a coolant in the piston head;

b. Application of a layer of a material which has a high heat resistance, a high creep strength and a high melting point;

c. At the edge of the interior combustion chamber of a light alloy piston for diesel engines with direct injection a ring of ferrous material and at those points of the piston head where the risk of a high overheating is existing sheets of ferrous material are embedded.

d. Incorporation of valve like inserts in bores which extend through the piston head; these inserts are screwed into the interior of the piston; this measure has the disadvantage that part of the combustion gases are blown into the crankcase in case of damage to the seal between the insert and the bore.

The problems relating to the formation of thermal cracks and of softening and melting due to an overheating of the light alloy piston have been sufficiently solved by the above-mentioned measures.

In pistons for diesel engines, particularly with direct injection, these measures are not sufficient, however, to avoid thermal fatigue cracks which extend from the edge of the combustion chamber recess. High temperatures up to 600° C. occur in the combustion chamber recess and are highly in excess of the safe temperature limit of the known materials for light metal pistons. Owing to these temperatures, particular the edge of the combustion chamber recess is subjected to critical stresses, particularly when the combustion chamber recess is very deep or is undercut. The heat transfer in this zone is increased by the high velocity of the gases and the dissipation of heat is reduced, particularly if the recess opens at a small angle. This results in a temperature rise at the edge of the combustion chamber recess and, in conjunction with the high tangential stress which is due to the temperature distribution, in stresses in excess of the elastic limit. Tensile stresses result from a cooling in case of a change of the load or stopping of the diesel engine. When this sequence takes place frequently, as in engines of vehicles, thermal fatigue cracks will be formed, which may grow to a large depth and in pistons having a cooling chamber may open into the cavity so that the combustion gases are blown through.

The edge of the recess may be relieved from stresses to a limited extent by an optimum design aiming at a decrease of the stresses due to the gas force and temperature distribution and by a rounding of edges and valve pockets. As regards the material, its high-temperature strength is significant as well as its thermal expansion and its maximum plastic strain. Comparative tests have shown the advantages of eutectic alloys over hypereutectic alloys and of wrought alloys over cast alloys. Attempts to improve the resistance to thermal fatigue by a local heat treatment or by a surface deformation, e.g., by shot blasting, have not given favorable results.

For a limited running time, an improvement can be obtained by a reinforcement of the edge of the recess by an embedded ring of nickel-alloyed cast iron, which in ring carrier pistons may be integrally joined to the ring carrier by webs (German Utility Model No. 1,890,021). After 300,000 to 400,000 km, however, damages have been observed which are due to the fact that parts of the cast-iron ring have broken out. The austenitic material has a smaller thermal expansion than the aluminum alloy but becomes much hotter. After prolonged operation, the permanent deformation results in a gap between the insert and the piston head.

Further disadvantages of such a reinforcement of the recess reside in the fact that it is difficult to provide a cooling cavity in the piston in an effective position and in the increase of the weight and manufacturing costs of the piston. In endeavors to find alternative solutions which avoid the above-mentioned disadvantages, piston heads provided with metal or cermet layers applied by plasma spraying have been investigated. In such pistons, the formation of the layer adjacent to the edge will be disturbed and a sufficient high bond strength will not be obtained particularly when the recess has a sharp edge, which is particularly endangered. Piston heads of ferrous materials having a high high-temperature strength, such as steel or gray cast iron, are not desirable owing to their heavy weight.

Considerable success has recently resulted from the use of aluminum alloy piston heads coated with a hard anodized layer. The use of such layer increases the running time before a formation of incipient cracks four times compared to the non-reinforced piston head. For instance, a non-reinforced piston made of a wrought alloy had formed gaping cracks at the edge of the recess after a run of about 90,000 km. When the entire piston head is anodized by a special process, the same piston will be entirely free of cracks after 400,000 km. The protection afforded by a hard anodized layer against a damage of the grain boundaries is particularly pronounced with a fine basic structure.

Because the hard anodized layer is not applied but is formed from the basic material, no problems are involved in the adherence of the layer.

The hard anodized layer seals the piston head and affords protection against corrosion and oxidation. It also provides a good heat insulation but does not influence the strength values of the piston material.

Whereas the hard anodized layer affords these advantages and prevents or retards the formation of cracks in the piston head in some regions, particularly in the regions subjected to high thermal stresses, it has been found that it promotes the formation of cracks in other regions, particularly those which are highly stressed by gas and mass forces.

SUMMARY

This invention provides a light aluminum alloy piston on its piston head having a combustion chamber recess with a hard anodized layer in such a manner that the formation of cracks is prevented or retarded in the regions which are under high thermal stresses as well as in the regions which are highly stressed by gas and mass forces.

This is accomplished in that the piston head is free of a hard anodized layer in those regions which are highly stressed by gas and mass forces.

Specifically, those regions of the piston head which are adjacent to those edge portions of the combustion chamber recess that lie in the direction of the piston pin are free of a hard anodized layer.

DESCRIPTION

In light alloy pistons in which the piston head is formed with valve pockets, the regions adjacent to the edges of these valve pockets are suitably also free of a hard anodized layer.

A preferred feature of the invention relates to light aluminum alloy pistons for diesel engines with direct injection, which piston has a piston head provided with a combustion chamber recess and a fuel-guiding channel associated therewith, and resides in that a hard anodized layer is provided only adjacent to the fuel-guiding channel.

The anodized layer consists of a comparatively thin, almost non-porous, dielectric barrier layer, which has a thickness of 35-80 microns and consists of pure alumina, and a covering layer having a porous structure and consisting of alumina and aluminum hydroxide.

The anodized layer has a hardness between 450 and 550 HV.

A plurality of processes may be used to produce the hard anodized layer (W. Hübner and A. Schildknecht, "Die Praxis der anodischen Oxidation", Aluminium-Verlag, Düsseldorf 1961). These processes differ from those resulting in normal anodized layers in the composition of the electrolyte and by a low temperature of the electrolyte and a higher current density. The constantly low temperature results in a rapid dissipation of the heat cause by the anodizing and in a much smaller re-dissolution of the covering layer so that the resulting layers have a high hardness.

Figure 1:
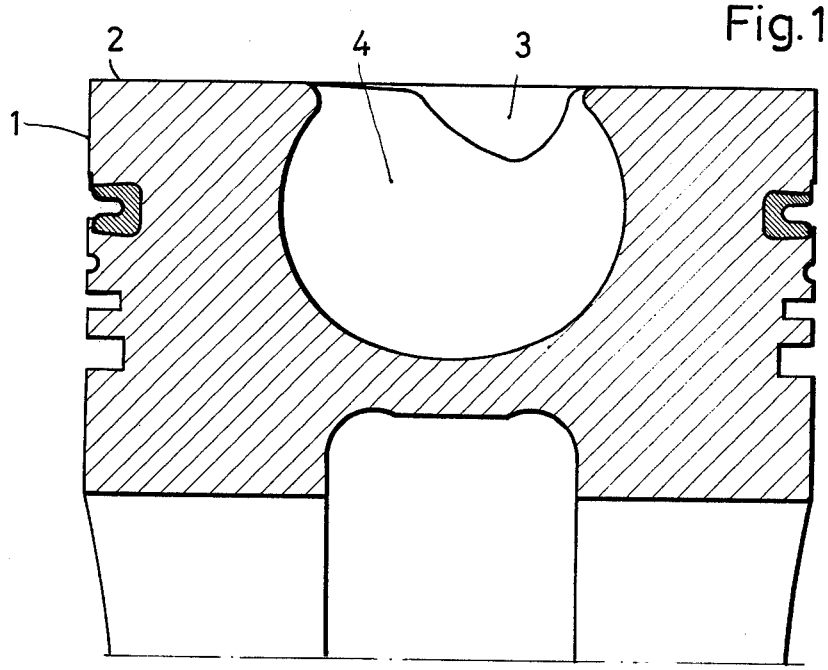
FIG. 1 is a vertical cross-sectional view of a piston according to the invention.
Figure 2:
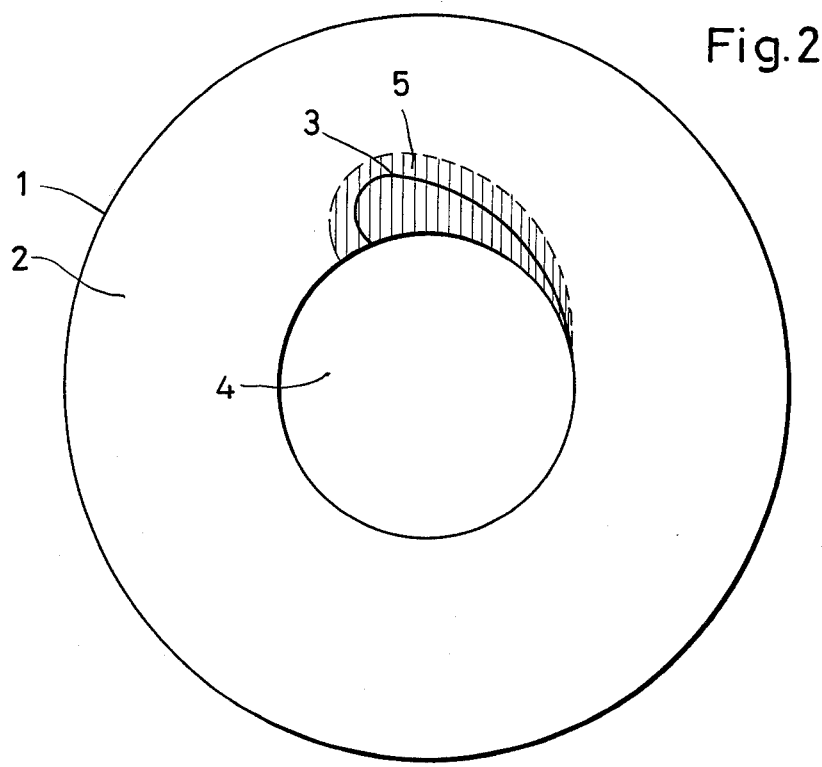
FIG. 2 is a top plain view of the piston of FIG. 1.
Figure 3:
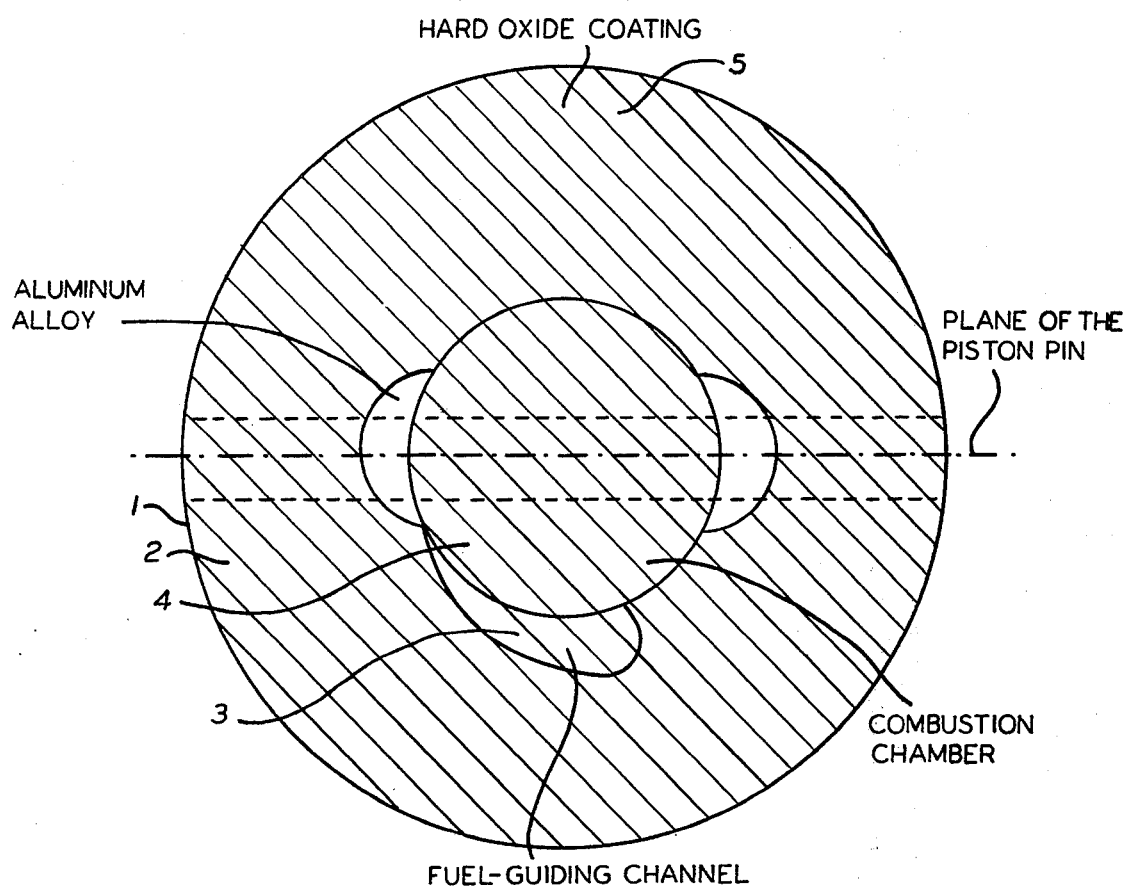
FIG. 3 is a top view of the piston with an eloxal layer.
Figure 4:
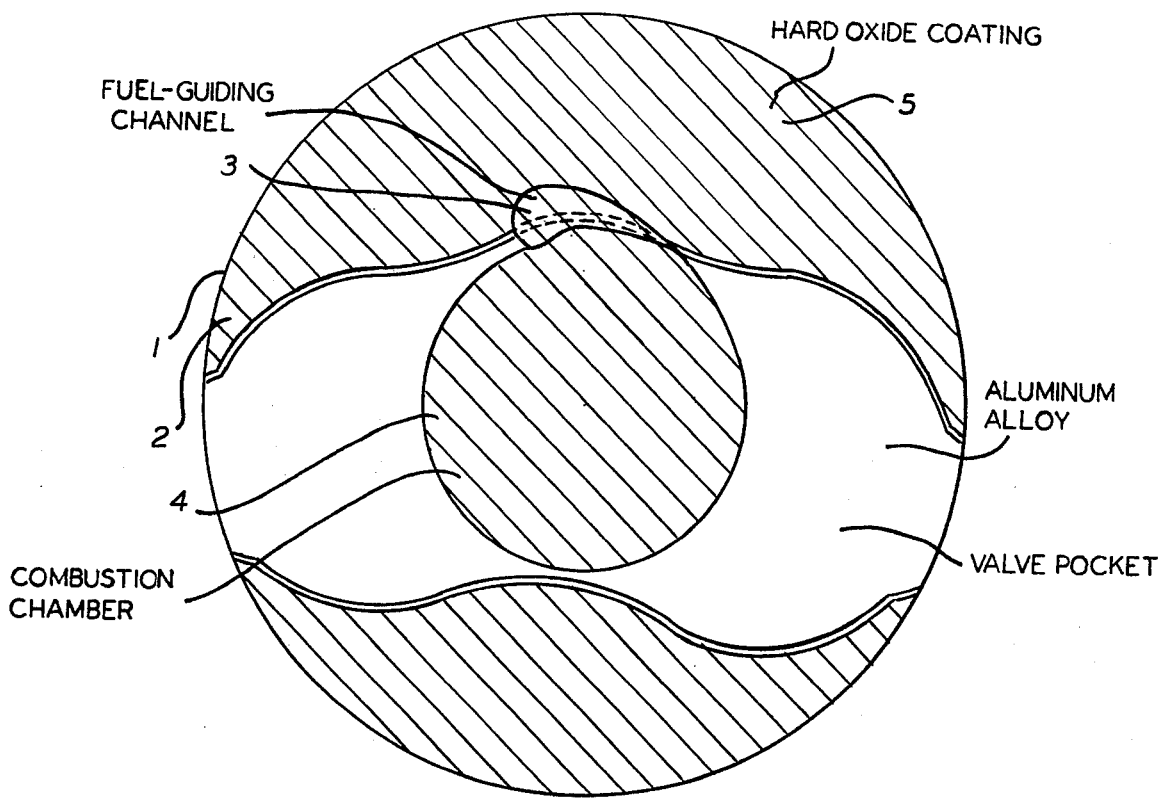
FIGS. 4 and 5 are top and side views, respectively, of a piston with a modified eloxal layer.
Figure 5:
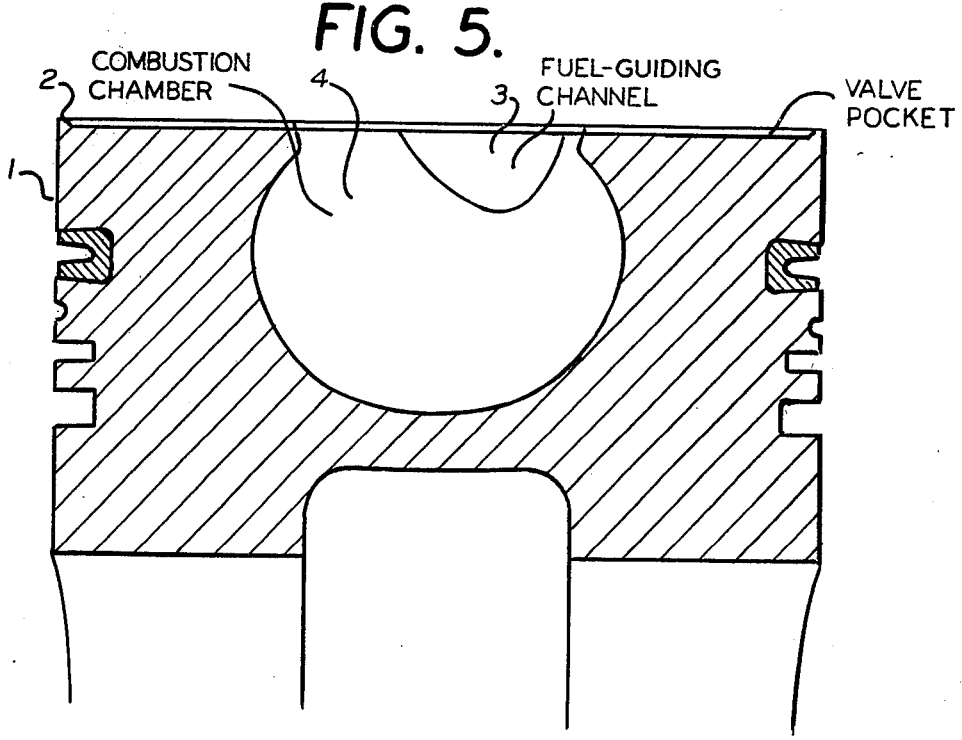

FIG. 1 and FIG. 2 show a piston 1 for diesel engines with direct injection. The piston consists of the piston alloy AlSi12CuNiMg. The piston head 2 is formed with a combustion chamber recess 4 provided with a fuel-guiding channel 3.

The fuel-guiding channel 3 is a trough-shaped channel, which extends along the edge of the combustion chamber recess and is inclined toward the latter. The channel 3 guides the injected fuel or fuel mixture so that it enters the combustion chamber recess in a tangential direction.

The piston 1 is coated with a hard anodized layer 5 in a thickness of 40 microns only adjacent to the fuel-guiding channel 3.

An investigation of this piston which has a piston head provided with the hard anodized layer according to the invention has shown that the running time for which this piston can be used until thermal cracks are formed is much longer than with a piston covered with a hard anodized layer throughout the piston head.

What is claimed is:

1. Light alloy piston for diesel engines comprising a piston head covered with a hard eloxal coating and having an interior combustion chamber therein and a piston pin received in the piston head, said piston head being free of the hard eloxal coating in those regions which are adjacent to the edge portion of the interior combustion chamber lying in the plane of the piston pin.

2. Light alloy piston of claim 1 wherein the hard eloxal coating has a thickness of 35–80 microns.

3. Light alloy piston for diesel engines comprising a piston head covered with a hard eloxal coating and having valve pockets therein, said piston head being free of the hard eloxal coating in the regions of the valve pockets.

4. Light alloy piston of claim 3, wherein the hard eloxal coating has a thickness of 35–80 microns.

5. Light alloy piston for diesel engines comprising a piston head covered with a hard eloxal coating and having an interior combustion chamber and valve pockets therein and a piston pin received in the piston head, said piston head being free of the hard eloxal coating in the regions of the valve pockets and in those regions which are adjacent to the edge portions of the interior combustion chamber lying in the plane of the piston pin.

6. Light alloy piston of claim 5, wherein the hard eloxal coating has a thickness of 35–80 microns.

* * * * *